US009623477B2

(12) United States Patent
Arbesman et al.

(10) Patent No.: US 9,623,477 B2
(45) Date of Patent: *Apr. 18, 2017

(54) APPARATUS FOR TEXTURING THE SURFACE OF A BRAKE PLATE

(71) Applicant: NUCAP INDUSTRIES INC., Scarborough (CA)

(72) Inventors: Ray Arbesman, Toronto (CA); Nghi Pham, Concord (CA)

(73) Assignee: Nucap Industries Inc., Scarborough (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/877,375

(22) Filed: Oct. 7, 2015

(65) Prior Publication Data

US 2016/0023267 A1 Jan. 28, 2016

Related U.S. Application Data

(63) Continuation of application No. 13/706,120, filed on Dec. 5, 2012, now Pat. No. 9,199,322.

(30) Foreign Application Priority Data

Dec. 6, 2011 (CA) .................................... 2760923

(51) Int. Cl.
B21J 13/02 (2006.01)
B21J 5/12 (2006.01)
(Continued)

(52) U.S. Cl.
CPC ............... B21J 13/025 (2013.01); B21J 5/12 (2013.01); B21K 23/00 (2013.01); B23D 79/00 (2013.01)

(58) Field of Classification Search
CPC .......... B21J 5/12; B21J 13/025; B21K 23/00; B23D 79/00; B30B 7/02; B30B 15/06
See application file for complete search history.

(56) References Cited

U.S. PATENT DOCUMENTS 428,011 A 5/1890 Logan
499,621 A 6/1893 Weed
(Continued)

FOREIGN PATENT DOCUMENTS

CA 618550 4/1961
CA 1337622 C 11/1995
(Continued)

OTHER PUBLICATIONS

PCT International Search Report for PCT/CA/00/00159 dated Jun. 28, 2000.
(Continued)

Primary Examiner — Moshe Wilensky
Assistant Examiner — Pradeep C Battula
(74) Attorney, Agent, or Firm — Bereskin & Parr LLP/S.E.N.C.R.L., s.r.l.; Victor Krichker; Adrienne Bieber McNeil

(57) ABSTRACT

An apparatus is provided for texturing the surface of a brake plate has three die plates and spring supports therebetween. A toothed tooling mounts to the top die plate above an anvil on the center die plate both of which ride on posts held by the lower die plate. The toothed tooling comprises multiple blades each with multiple replaceable toothed inserts are held in a cartridge arrangement. The anvil receives brake plates from a separately supported plate feed mechanism with greatly reduced reciprocating mass. The complete die set can be set up on the bench and inserted ready to use in any style of press where the press ram contacts the upper die plate.

11 Claims, 4 Drawing Sheets

(51) Int. Cl.
*B21K 23/00* (2006.01)
*B23D 79/00* (2006.01)

(56) References Cited

U.S. PATENT DOCUMENTS

| | | | |
|---|---|---|---|
| 649,762 A | 5/1900 | Saltzkorn et al. | |
| 1,044,283 A | 11/1912 | Stanger | |
| 1,336,752 A | 4/1920 | Muller | |
| 2,173,730 A | 9/1939 | Schmied | |
| 2,255,268 A | 9/1941 | Perrine | |
| 2,324,496 A | 7/1943 | De Rentiis | |
| 2,613,743 A | 10/1952 | Bangerter | |
| 2,843,173 A | 7/1958 | De Voss | |
| 2,879,866 A | 3/1959 | Newell | |
| 3,147,528 A | 9/1964 | Erb | |
| 3,314,271 A | 4/1967 | Otis | |
| 3,557,407 A | 1/1971 | Lemelson | |
| 3,886,639 A | 6/1975 | Pasternak | |
| 3,915,272 A | 10/1975 | Maurice | |
| 4,023,613 A | 5/1977 | Uebayasi et al. | |
| 4,428,214 A | 1/1984 | Head, Jr. et al. | |
| 4,569,424 A | 2/1986 | Taylor, Jr. | |
| 4,588,050 A | 5/1986 | Urban | |
| 4,640,390 A | 2/1987 | Saumweber et al. | |
| 4,799,579 A | 1/1989 | Myers et al. | |
| 4,890,476 A | 1/1990 | Takahashi et al. | |
| 5,141,083 A | 8/1992 | Burgoon | |
| 5,236,528 A | 8/1993 | Nakagawa | |
| 5,285,873 A | 2/1994 | Arbesman | |
| 5,376,410 A | 12/1994 | MacKelvie | |
| 5,720,197 A | 2/1998 | Grau et al. | |
| 5,788,247 A | 8/1998 | Tensor | |
| 5,890,566 A | 4/1999 | Yoshida et al. | |
| RE36,313 E | 9/1999 | Kahr | |
| 6,142,045 A | 11/2000 | Coxe | |
| 6,276,045 B1 | 8/2001 | Buchi et al. | |
| 6,327,887 B1 | 12/2001 | Kunz et al. | |
| 6,367,600 B1 | 4/2002 | Arbesman | |
| 6,431,331 B1 | 8/2002 | Arbesman | |
| 6,464,047 B1 | 10/2002 | Arbesman | |
| 6,553,869 B1 | 4/2003 | MacKelvie | |
| 6,584,822 B2 | 7/2003 | Kunz et al. | |
| 6,843,095 B2 * | 1/2005 | Arbesman | B21J 5/12 72/325 |
| 6,910,255 B2 | 6/2005 | Arbesman | |
| 6,986,273 B2 | 1/2006 | Rager | |
| 7,200,940 B2 | 4/2007 | MacKelvie | |
| 7,249,483 B2 | 7/2007 | Pham | |
| 7,430,889 B2 | 10/2008 | Jung et al. | |
| 7,469,567 B2 | 12/2008 | Jung | |
| 9,199,322 B2 * | 12/2015 | Arbesman | B21K 23/00 |
| 2004/0016608 A1 * | 1/2004 | Gutowski | B21J 5/12 188/73.1 |
| 2004/0040796 A1 | 3/2004 | Pham | |
| 2004/0140165 A1 | 7/2004 | Pham | |
| 2009/0255316 A1 * | 10/2009 | Murata | B21J 5/02 72/345 |

FOREIGN PATENT DOCUMENTS

| | | |
|---|---|---|
| CA | 2270981 C | 8/2005 |
| CA | 2588431 A1 | 10/2008 |
| CN | 201799698 U | 4/2011 |
| CN | 202219520 U | 5/2012 |
| CN | 102658560 A | 9/2012 |
| DE | 2242877 A1 | 3/1974 |
| DE | 2423870 A1 | 12/1974 |
| DE | 2427694 A1 | 12/1975 |
| DE | 2020040230369 U1 | 5/2005 |
| EP | 0349497 A2 | 1/1990 |
| EP | 1625901 A1 | 2/2006 |
| FR | 2143626 A1 | 2/1973 |
| GB | 319856 | 10/1929 |
| GB | 2245667 A | 1/1992 |
| GB | 2299382 A | 10/1996 |
| JP | 55-139534 A | 10/1980 |
| JP | 55-139577 A | 10/1980 |
| JP | 56-31535 A | 3/1981 |
| JP | 63-40620 A | 2/1988 |
| JP | 2-263531 A | 10/1990 |
| JP | 2008-200744 A | 9/2008 |
| TW | 200836851 A | 9/2008 |
| WO | 00/49308 A1 | 8/2000 |

OTHER PUBLICATIONS

Tooth Form, Pitch & Set, Specialty Saw Inc., Available at www.SpecialtySaw.com.

Machined Surface Quality, Quality Control in Furniture Manufacture, Available at http://www.mtc.com.my/publication/library/quality/qc71.htm, Jan. 25, 2002.

Glossary of Saw Blade Terms, Oldham, Available at http://www.oldham-usa.com/Products/SawMain/Terms/BladeTerms.htm, Jun. 23, 2003.

Saw Blades, The Wood Shop, Available at http://www.thewoodshop.20m.com/sawblades.htm.

* cited by examiner

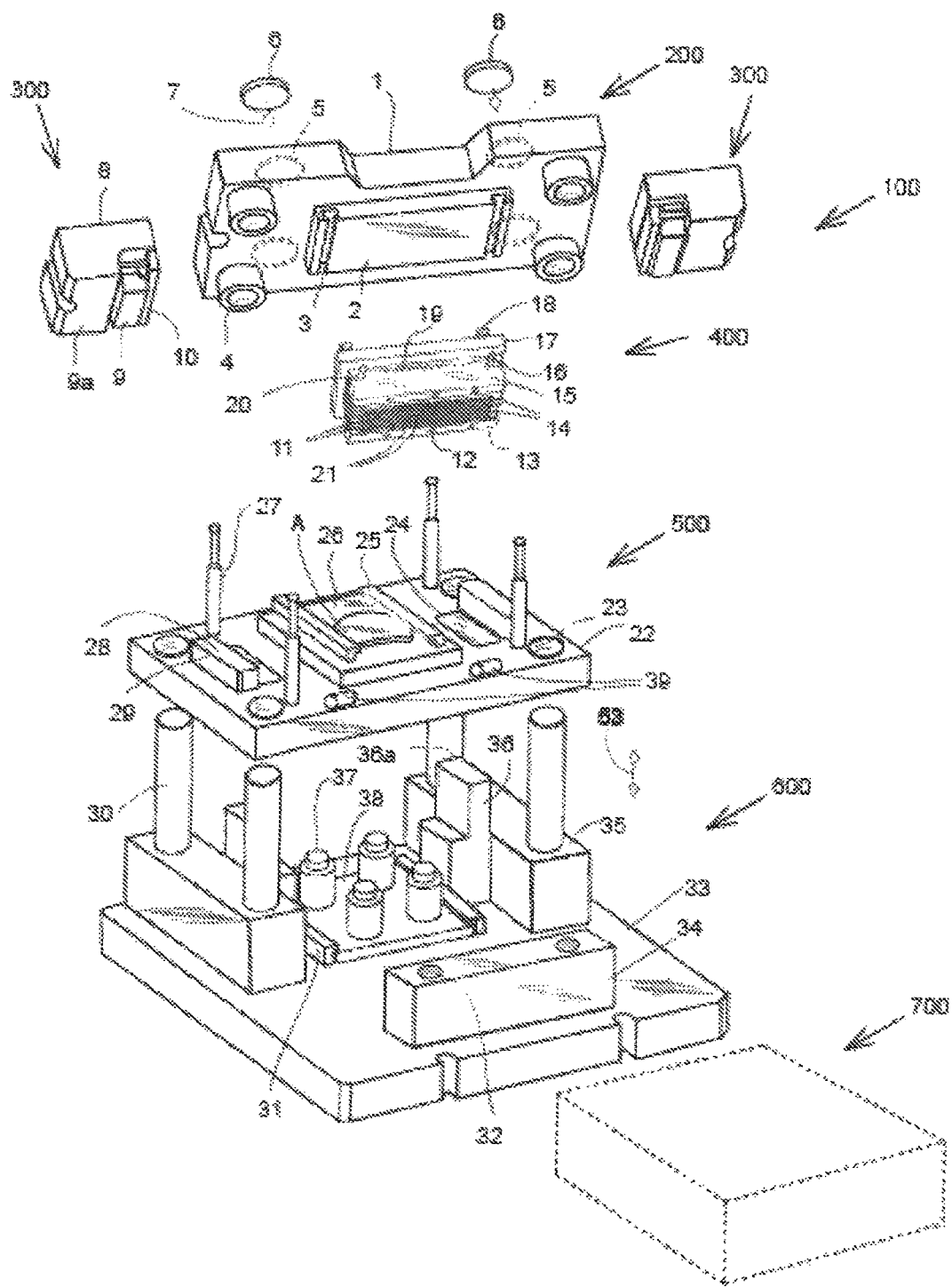

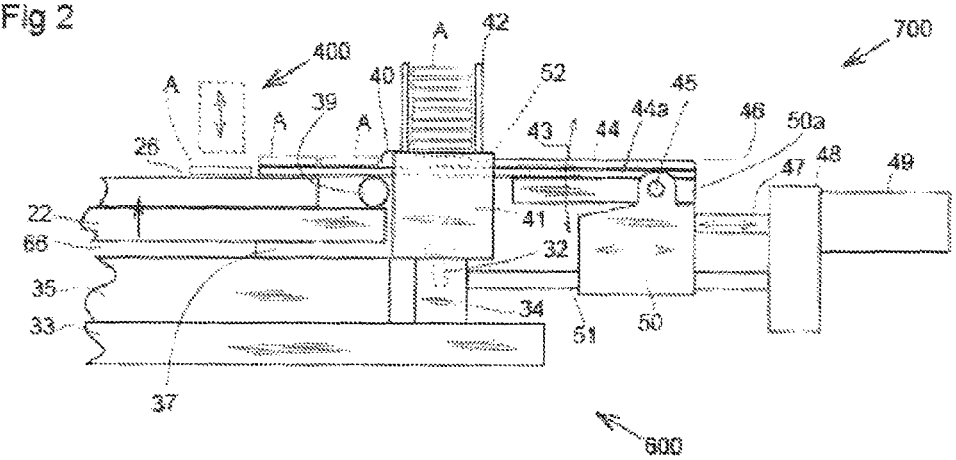
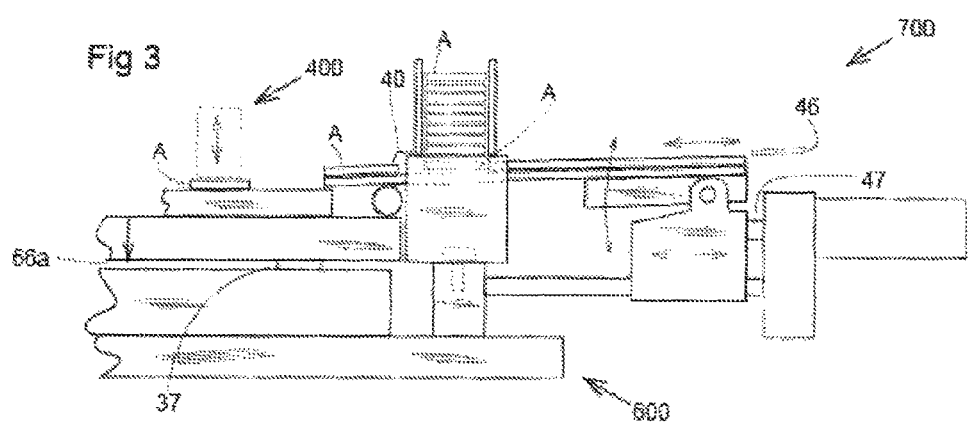
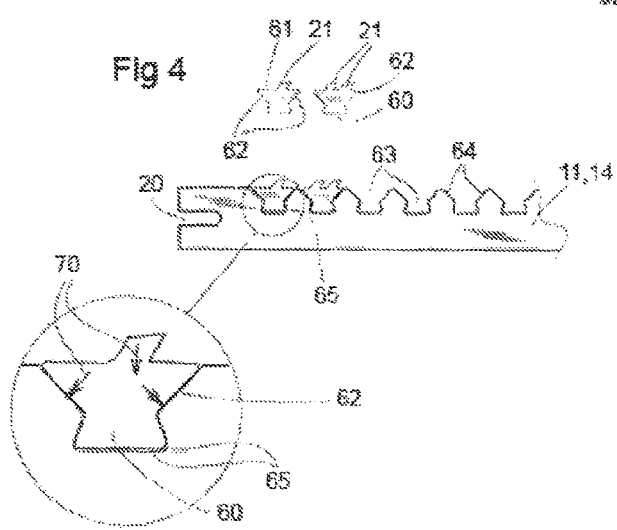

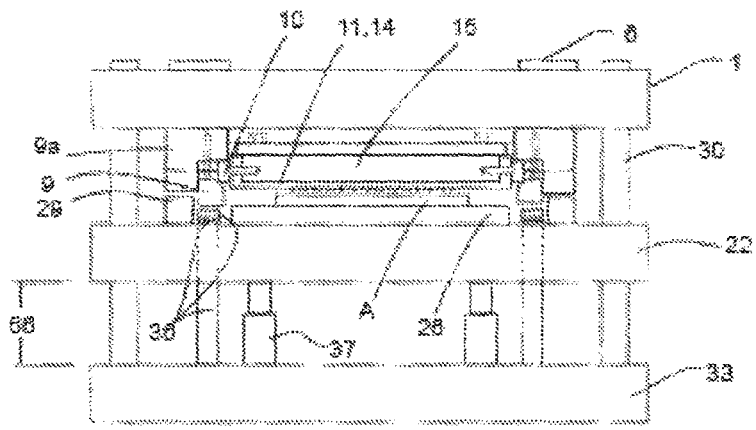
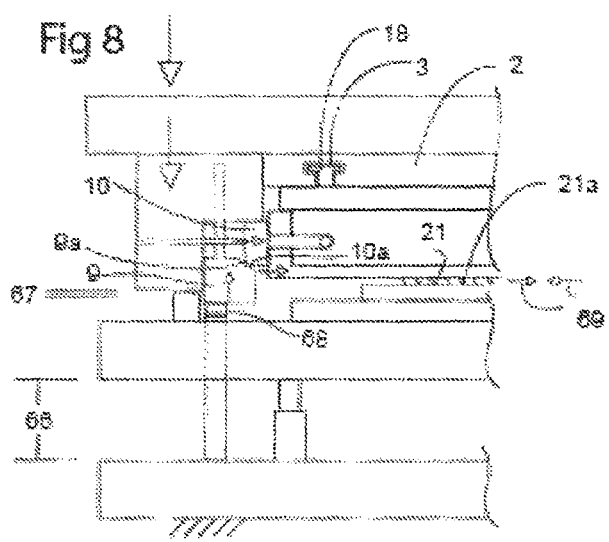
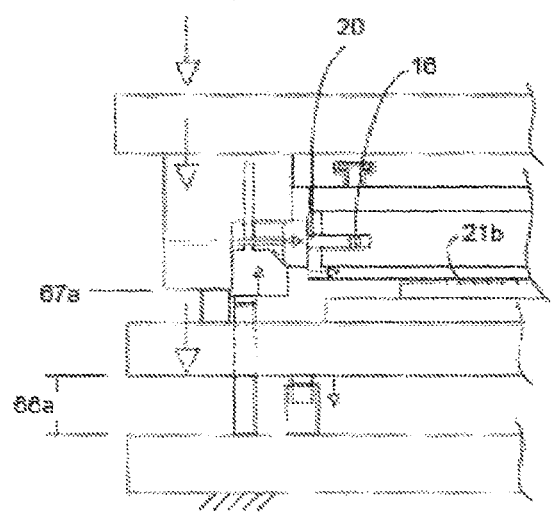

APPARATUS FOR TEXTURING THE SURFACE OF A BRAKE PLATE

CROSS-REFERENCE TO RELATED APPLICATIONS

This application is a continuation of U.S. patent application Ser. No. 13/706,120 filed Dec. 5, 2012 (now U.S. Pat. No. 9,199,322, issued on Dec. 1, 2015), which claims priority from Canadian Patent Application No. 2,760,923 filed Dec. 6, 2011, each of which is incorporated herein by reference in their entirety.

BACKGROUND OF THE INVENTION

Field of the Invention

The invention relates to apparatuses for texturing the surface of a brake plate.

Description of the Related Art

Secure brakes being all-important, the use of textured plates to anchor the friction pad is extremely desirable. However, the additional cost of plate texturing limits their real-world use to severe-service and high-end vehicles where the added cost is irrelevant. It would be desirable to lower the cost of texturing brake plates so that more widespread use could be made of this safety feature.

SUMMARY OF THE INVENTION

An apparatus is provided for texturing the surface of a brake plate having three die plates and spring supports therebetween. A toothed tooling mounts to the top die plate above an anvil on the centre die plate both of which ride on posts held by the lower die plate. The toothed tooling comprises multiple blades each with multiple replaceable toothed inserts which are held in a cartridge arrangement. The anvil receives brake plates from a separately supported plate feed mechanism. The complete die set can be set up on the bench and inserted ready to use in any style of press where the press ram contacts the upper die plate.

The three die plates of the present invention are all aligned on vertical posts. The posts are secured to the bottom or base die plate such that the centre and upper die plates are free to reciprocate thereon with the upper die plate uniquely carrying the texturizing tooling. In this way the entire die set installs as a free-standing one-piece assembly. The die set is mountable in a mechanical, hydraulic or servo type press.

This contrasts with prior apparatuses of this type in which texturizing tooling was attached to the press ram. This required that the lower, two-plate die set had to be precisely located beneath—a difficult task given the mass of the die set.

Certain support and actuation members are secured to the base die plate. Certain anvil structures are secured to the centre die plate. Certain cutting and press contact structures are secured to the upper die plate.

Accordingly, an apparatus is provided for texturing the surface of a brake plate. The apparatus comprises an independent and free-standing die set for use within a press. The die set has: a base die plate; a centre die plate; and an upper die plate. The base die plate is attachable to the press and has a series of fixed posts extending upward therefrom. The centre die plate is mounted above the base die plate on the posts and is also movable thereon. The centre die plate has an anvil portion for receiving a brake plate to be textured. The upper die plate is mounted above the centre die plate on the posts and is also movable thereon. The upper die plate has a tooling assembly with a plurality of oppositely acting blades located above the anvil portion. Opposing cam blocks are mounted below the upper die plate adjacent the oppositely acting blades. All of the plates are arranged in series such that downward force from the press urges the upper die plate into contact with the centre die plate, and the centre die plate downward toward the base die plate, and thereby actuates the cam blocks to drive teeth of the oppositely acting blades across and into the surface of the brake plate on the anvil. This action textures the surface of the brake plate. The base die plate is the only portion of the die set that attaches to the press.

For example, the base die plate may be built on a thick steel plate that bolts to the bolster of the press machine. Preferably, the plates are spring-biased apart. Four permanent vertical posts and four removable gas springs are arranged on the base. The springs may be manifolded together to equalize their spring rate and gas delivery so as to provide balanced support for the center die plate. By altering the gas pressure, the gas spring force can be adjusted for different sizes (surface areas or thicknesses) of brake plates to be textured (by providing more or less cutter action).

In one embodiment, the base die plate further includes opposing riser blocks, and the centre plate further includes opposing openings directly above the riser blocks. The riser blocks then extend through the openings to contact portions of the cam blocks to actuate the cam blocks as the upper and centre die plates descend. Preferably, each cam block has a vertical motion member and a horizontal blade moving member. The vertical motion member receives counterforce from the riser blocks, and engages into motion the horizontal blade moving member. The moving cams move the blades to carry out the texturing. (It will be appreciated that other methods of linear actuation of the blades are also possible.)

According to one embodiment, in operation, the press ram descends onto the upper die plate. The upper die plate then descends, engaging the two cams simultaneously. This initiates blade travel slightly prior to the cutting teeth inscribing the plate to create the required hooked burrs. In this way the cutting teeth are in horizontal motion before they drive down into the plate. The ram then ascends and the above the sequence of actions are reversed. The now textured plate is pushed off the anvil by a new incoming plate and the process repeats itself.

Smooth operation of the die set is desirable. The upper die plate may reciprocate on the posts via bushings. Its upper surface is contacted by the press ram. Preferably, the upper die plate has at least one elastomeric shock absorber disposed on an upper surface thereof. Multiple (preferably urethane) shock absorbing pads may be disposed on the top surface of the upper die plate. These pads are held in counterbored recesses such that the descending press ram contacts these pads first, thus providing a smooth and silent initiation of downward motion of the upper die against the initial resistance offered by the small gas springs.

The apparatus may further include a plate feed mechanism engageable with the centre plate. The plate feed mechanism has a magazine for holding brake plates to be textured; and a reciprocating slide mechanism for pushing brake plates onto the anvil one by one as they descend from the magazine. Preferably, the load of the magazine is supported independently of the die set. Preferably, the plate feed mechanism is detachable from the die set. Preferably, the plate feed mechanism further includes a pawl for preventing rearward motion of the brake plate. Preferably, the reciprocating slide mechanism has a variable delivery angle.

The weight of the plate feed mechanism is preferably supported on a solid mounting block secured to the base die plate (or press bolster). This greatly reduces the reciprocating mass on the die set allowing a higher rate of reciprocation for faster plate texturizing and reduced cost. Reduced reciprocating mass also eliminates expensive wear from side thrust on the die set posts and bushings which would otherwise occur if the entire plate feed mechanism were cantilevered from—and made to reciprocate with the die plate, as is the case in the prior art. Such wear necessitates the tear down of the entire die set to replace the worn posts and bushings. The result is a long non-productive down-time to rebuild the dies and the attendant labour expense.

The plate feed apparatus comprises a plate magazine assembly, a plate feed slide assembly, and a pneumatic linear actuator for the slide, all supported by the solid mounting block on the base die. The plate slide assembly uses long steel strips as slides in a laminated assembly which are separate from, but pass through and are guided by, the magazine assembly. The slides connect to a hinge block at their outboard (distal) end. This hinge block is separately supported on rods extending from that same solid mounting block (on base die plate die) along which rods it can reciprocate along with the plate slides. These rods also support the stationary actuating cylinder (pneumatic) which reciprocates the hinge block and slides. The inner (proximal) end of the lower plate slide rests on rollers secured to the edge of the centre die. The upper slide plate has features to receive a plate from the stack of plates held in the magazine above. Thus when the cylinder is activated, the reciprocating slides pick up plates on each rearward stroke and deliver the plates in a train-like flow to the anvil for texturing. Spring-loaded pawls or detents prevent the plates from moving backwards with the slide. In this way only a very small portion of the total weight of the plate feed mechanism is reciprocating with the centre die. Thus the posts and bushings do not experience the heavy wear known to be a serious problem with prior methods of plate delivery.

Various blade arrangements are possible. Preferably, the blades are opposingly arranged in the tooling assembly, such that adjacent blades have teeth oriented in opposed directions. The blades may be solid cutting knives, or may include modular inserts. Each blade preferably has at least one cut-out for receiving at least one insert. The insert has a first end on which is disposed a plurality of cutting teeth and a second end having a bulbous projection shaped to loosely engage a correspondingly shaped recess in the at least one cut-out. Preferably, the insert when inserted into the cut-out leaves a gap below the bulbous portion. Preferably, the insert is shaped to wedgingly engage the recess to narrow the gap under force of operation in the press.

Preferably, the inserts and cut-outs have corresponding side taper portions for seating and bulbous bottom portions for retention. The bulbous portion of the cut-out is slightly deeper that of the insert. Thus, there is a gap between the bottom surface of the insert and the bottom surface of the cut-out. In operation the incising force acting on the cutting edge is able to drive the insert a small distance into the tapered cut-out such that the insert wedges very tightly, effectively immobilizing the insert in the blade. Because carbide is very friable and fractures easily if allowed to shudder or vibrate under the high cutting forces required to incise steel, this rigidity greatly prolongs the life of the teeth which reduces costs and reduces press down-time for tooling change-out.

The blade cartridge comprises the cutter blades (with the aforementioned toothed inserts) slidingly held in precisely aligned rows between robust side supports that are secured to a common backing plate which has mounting rails to slidingly engage grooves in a plate attached to the top die. The blades and the side supports all have open slots at each end that are in alignment and through which slots are pins that extend outboard of each side support to provide attachment for return springs stretched between the two ends of the two pins. The rows of blades are off-set alternately such that the cams at each end actuate only half the blades which therefore move in opposite directions.

Preferably, the blades are spring-loaded such that each tooth makes a relatively short gouged inscription and a retention hook on the brake plate before retracting and disengaging from the brake plate.

The upper die plate may be spaced away from the centre die plate for permitting removal and re-insertion of the tooling assembly (e.g. by support from smaller gas springs). The blade cartridge is preferably constructed for easy tooling change-over and maintenance. Preferably, the tooling assembly is mounted to the upper die plate on rails for permitting removal and re-insertion of the tooling assembly. Preferably, at least one sensor is provided on or near the die set proximate to the anvil for monitoring the texturing operation of the tooling assembly (e.g. to monitor hook formation). Sensors may detect the height of undersized burrs and/or ill-positioned plates and thereby provide input to machine controls to stop the texturing process preventing inferior plates from leaving the press.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows a perspective view of the die set with the base, centre and upper die plates, the cam blocks and blade cartridge, and the location of the plate feed mechanism in dashed outline.

FIG. 2 shows the plate feed mechanism from the side in its forward position of plate delivery.

FIG. 3 shows, the same as FIG. 2 in the rearward position for plate pickup.

FIG. 4 shows the blade and insert tooth arrangement and an enlargement thereof.

FIG. 7 shows a simplified side view of the instant invention in its resting state so as to clearly disclose the blade movement sequence.

FIG. 8 is an enlarged left portion of FIG. 7 where the upper die plate contacts the centre die plate.

FIG. 9 is the same as FIG. 8 but with the two die plates moving in unison.

DETAILED DESCRIPTION

Figure 5:
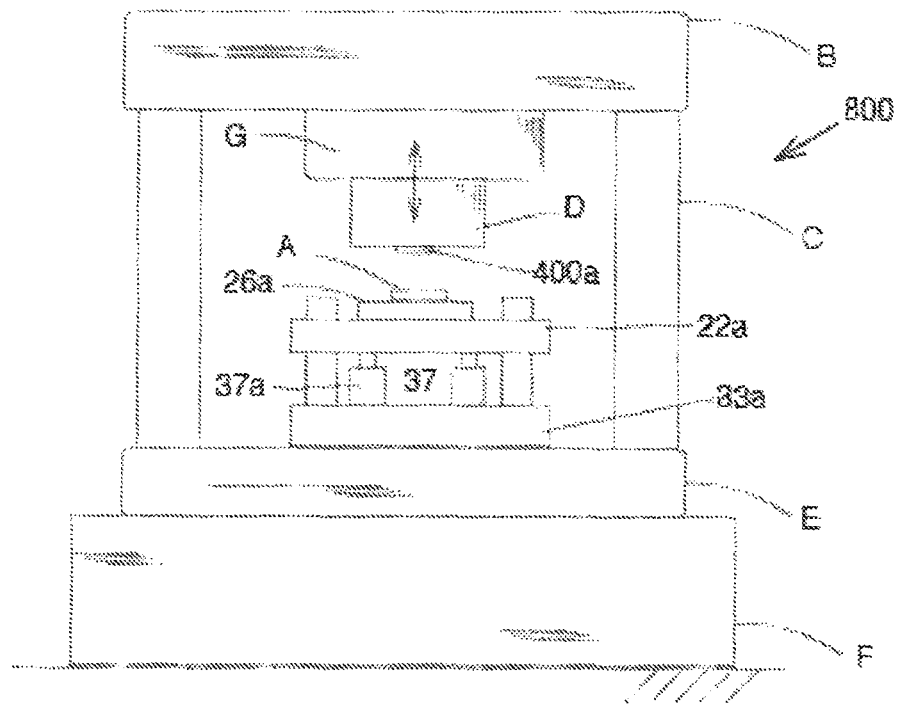
FIG. 5 shows the prior art dies set in a press with the tooling secured to the ram face.

Referring to the drawings, there are sometimes shown small gaps or spaces between components. This is for clarity of understanding but in actual fact most components fit tightly together except where otherwise noted.

In FIG. 1 the instant three piece die set 100 has as its major components: upper die plate 200 with tooling assembly 400 and associated cam blocks 300; centre die plate 500 with anvil 26; base or lower die plate 600 with posts; and plate feed mechanism 700, shown as a placement outline in FIG. 1 and in greater detail in FIGS. 2, 3. Die set 100 installs in press 900 (FIG. 6) where it is attached to its bolster plate E. Press 800 and 900 have base F and upper frame 8 connected together with tie rods C. Cylinder G has ram D that is reciprocated therein. The press 900 may be mechanical, hydraulic, or a servo type press.

Figure 6:
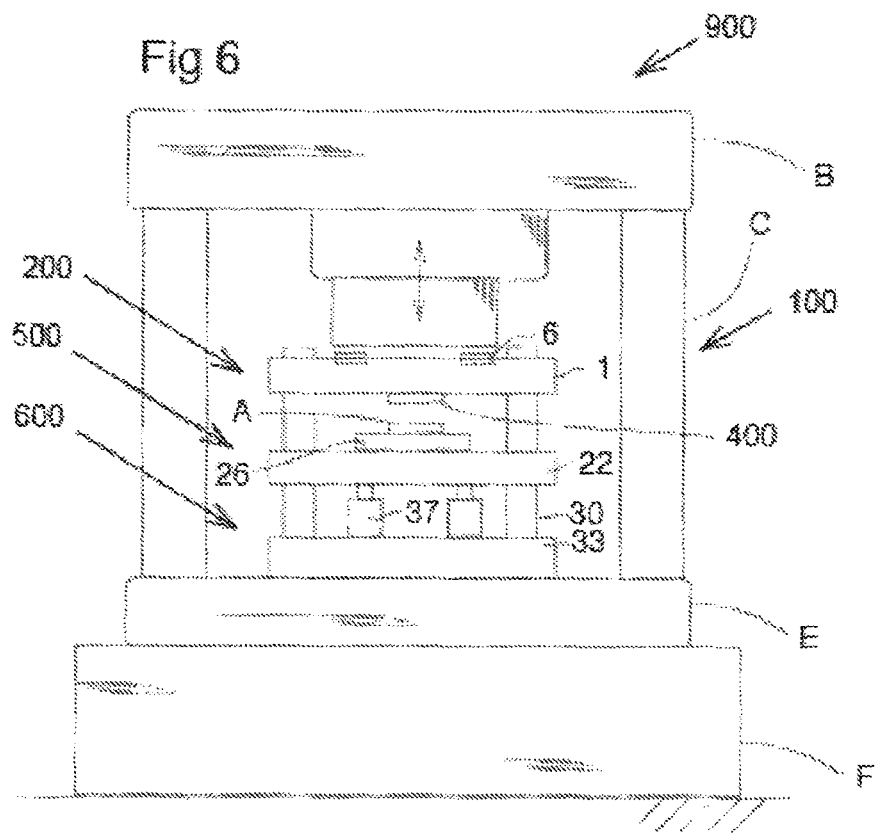
FIG. 6 shows the instant three plate die set in the same press with the tooling secured to the upper die plate.

The prior art show in block outline in FIG. 5 uses a two plate die set with tooling attached to the press ram. This makes it difficult to install, adjust, test and change-out the tooling. Critically, the alignment of the tooling with the die set is also difficult given the mass of the die set (many hundreds of pounds) and the need for its precise location beneath the separately mounted tooling. FIG. 6 shows the same press with the three plate die set of the instant invention and how the tooling alignment is pre-set prior to installing on the press where the die set location is not critical and therefore much easier and faster.

Referring back to FIG. 1, base die plate 600 has base die plate 33 (with means to secure it to press bolster E), four rigid posts 30 secured in stop blocks 35, two stepped riser blocks 36 with upper contact faces 36a. A removable slide 38 carries four manifolded gas springs 37 and is located by two guides 31. On base die plate 33 is rigid block 34 with attachment means 32 to secure plate feed mechanism 700 thereto.

Upper die plate 200 has elastomeric pads 6 secured in recesses 5 in the top surface of plate 1 as shown by arrow 7. These pads are compressed by the descending ram D making for a cushioned, silent contact with top die plate 1 and which also initiate the descent of upper plate 200. Four through-bushings 4 slide on posts 30. Cam blocks 300 attach to the underside and are separated by pressure plate 2 which has guides 3 to receive tooling rails 18 on tooling assembly 400.

Referring to FIG. 1 and FIGS. 7-9 (where FIGS. 8, 9 show simplified left half views of FIG. 7 for enlarged clarity) left and right cam blocks 300 have secured body portions 8 with guided, spring-return moving elements. When die plate 200 descends each vertical moving element 9 contacts surface 36a of riser block 36. Elements 9 have angular contact surfaces 9a. Each horizontal moving element 10 has a matching angular contact surface 10a. As die plate 200 descends, these angular surfaces engage in a sliding contact such that the horizontal moving elements 10 move towards each other. Toothed blades 11, 14 held in tool assembly 400, are arranged to move under the force of horizontal moving elements 10. Horizontal blade motion is timed to begin just slightly before the teeth contact the brake plate A. In this way, the teeth skate (21a in FIG. 8) into plate A to avoid unwanted sudden impact that would damage the sharp tooth tips. After a certain distance of vertical descent of die plate 200, shown change in gaps 67 and 67a in FIGS. 8, 9, secured body portions 8 contact secured blocks 29 causing centre die plate 500 to thereafter descend with descending die plate 200. As descent of the upper and centre the plates continues, gap 66 between die plate 200 and die plate 600 is reduced to gas 66a, the descent being resisted by the adjustable force of gas springs 37 which allows teeth 21 to continue incising controllably across and into plate A, as indicated by buried teeth 21b in FIG. 9. Removable shims 68 in riser blocks 36 allow precise adjustment to compensate for varying thicknesses of plate A and for manufacturing/specification tolerances.

Centre die plate 500 has plate 22 with four post through-bushings 23 (to slide on posts 30) an anvil plate 26 on which brake plate A, is delivered between guides 25 for texturing. Openings 24 enable stepped riser blocks 26 to protrude through plate 22 and to contact vertical moving element 9 mounted in cam block 8. Centre die plate 500 also has four gas springs 27 of sufficient strength to hold upper die plate 200 open over centre die plate 500 for rapid tooling change-out. Pressure blocks 29 have upper contact surfaces 28 that contact cam block contact surfaces 9a and transfer downward motion of upper die plate 200 to centre die plate 500 such that both move downwards together compressing first gas springs 27 then gas springs 37. On the edge of plate 22 are two roller supports 29 on which rests and pivots the inboard end of plate feed slides 44, 44a.

Upper the plate 200 holds quick-change tooling assembly 400 which includes left blades 11 and right blades 14 having shorter and longer slots 20 formed in end portions. Blades 11 and 14 are arranged in alternating rows and are slidingly held between rigid side fences 13, 15. The arrangement is such that the blades are offset horizontally and their respective teeth 21 are pointing in opposite directions. Spring loaded left and right pins 16 engage the blades' slots and co-operating slots in the side fences 15. Pins 16 are tensioned towards each other via outboard springs 19. In this way blades 11, 14 are made to move in opposite directions so as to cancel out their inscribing forces making it unnecessary to clamp brake plate A which speeds production. The side fences 13, 15 are bolted 12 to a pressure plate 17 and the plain backs of the blades also contact plate 17. Pressure plate 17 has rails 18 secured to its top surface that slidingly engage guide slots 3.

Attention is now drawn to FIGS. 2, 3 which show a side view representation of plate feed mechanism 600 at each end of its operational stroke. FIG. 2 shows the brake plate delivery position while FIG. 3 shows the rearward brake pick up position. Main magazine member 41 includes brake plate support rods 42 and is mounted rigidly to rigid block 34 on base die plate 33. Brake plates A drop through an opening in member 41 onto reciprocating slide 44 with sub-slide 44a beneath. Both slides pass freely through member 41 and are guided by same. Extending from rigid block 34 are rigid support rods 51 along whose length slide block 50 can be adjustably secured. Slide block 50 holds a separate hinge plate 50a pivoted thereon via cross pin 45 and shown by arced arrow lines 43. Slides 44, 44a are secured to hinge plate 50a. Also adjustably secured to rods 51 is a pneumatic cylinder 49 with mounting boss 48 and piston rod 47 which is secured to hinge block 50 such that rod 47, slides 44 and 44a, hinge block 50, and hinged plate 50a, all reciprocate together along support rods 51. In this way, brake plates A drop by gravity onto upper slide 44 and are moved one by one onto anvil 26 by the reciprocating action of pneumatic cylinder 49 which is timed to the reciprocating movement of the press 900. Rollers 39 support the inboard ends of slides 44, 44a and brake plates in conveyance, and allow free reciprocation left to right on anvil 26 as brake plates are successively delivered thereon. Rollers 39 also move the slides up and down as the center die plate so moves.

Slides 44, 44e are made extra long which serves a very important function, namely, it reduces the variation in delivery angle 46 of the brake plate to the anvil 26 between guides 26a. This means that the brake plate can be delivered with only a small variation in height. This avoids a jamming condition frequently encountered in prior apparatuses which reciprocate the entire brake plate feed mechanism with the centre dies plate. Attached to magazine member 41 are pawls 40, one of which is shown, which serve as one way controllers to prevent the rearward movement of brake plates resting on the slide 44 which necessarily must travel rearwards.

Referring now to FIG. 4, blades 11, 14 have end slots 20 and cut-outs 63. Cut-outs 63 receive inserts 61 such that enlarged or bulbous portions prevent the insert from falling from the blade. Certain inserts have cutting teeth 21. Certain inserts may also have no teeth (not shown). These are used as non-cutting spacers. All inserts have angled side portions 62. Cut-outs have matching angled sides 64 to provide a close it with the inserts. It is desirable to prevent relative motion between the inserts and their respective cut-outs which can lead to tooth breakage and expensive production stops to correct. As can be seen in the magnified view in FIG. 4 there is provided a cut-out having a slightly deeper bulbous portion indicated by 65. Each insert 61 can then be driven by forces of operation 70 into a jammed tight condition whereby intimate contact between the walls of the insert and cut-out cannot be interfered with by their bulbous portions contacting first.

Although the invention has been shown and described with respect to detailed embodiments thereof, it should be understood by those skilled in the art that various changes in form and detail thereof may be made without departing from a broad purposive construction of the claimed invention. For instance, although brake plates have been used as an example throughout the foregoing disclosure, it will be appreciated that the methods and apparatus described herein may be equally applicable to texturing other workpieces.

While the foregoing is directed to embodiments of the present invention, other and further embodiments of the invention may be devised without departing from the basic scope thereof, and the scope thereof is determined by the claims that follow.

The invention claimed is:

1. A free-standing die assembly for use within a press having a press ram and for texturing a workpiece, the die assembly comprising:
   a) a base die plate attachable to the press;
   b) a centre die plate mounted above the base die plate and having a portion for receiving the workpiece, the centre die plate vertically movable relative to the base die plate;
   c) an upper die plate mounted above the centre die plate for being urged downwardly by the press ram, the upper die plate vertically movable relative to the base die plate and the centre die plate;
   d) a plurality of blades mounted to the upper die plate above the portion for receiving the workpiece, the blades horizontally movable for texturing the workpiece received on the portion; and
   e) a blade moving member mounted adjacent the blades, the blade moving member forcing horizontal movement of the blades as the upper die plate descends toward the base die plate,
      wherein the base die plate includes a riser block for actuating the blade moving member to force horizontal movement of the blades as the upper die plate descends, the riser block extending through an opening in the centre die plate.

2. The assembly of claim 1 further comprising a first contact surface associated with the upper die plate and a second contact surface associated with the centre die plate, the first contact surface aligned to contact the second contact surface as the upper die plate descends to descend the centre die plate in unison with the upper die plate.

3. The assembly of claim 2, wherein the blade moving member is configured to force horizontal movement of the blades before the upper die plate and the centre die plate descend in unison.

4. The assembly of claim 2, wherein the blade moving member is configured to force horizontal movement of the blades as the upper die plate and the centre die plate descend in unison.

5. The assembly of claim 1, further comprising an angular contact surface configured to transfer a vertical counterforce from the riser block to horizontal movement of the blade moving member as the upper die plate descends.

6. The assembly of claim 1, wherein the riser block includes a removable shim for compensating for varying thicknesses of workpieces.

7. The assembly of claim 1, wherein the upper die plate and the centre die plate are biased apart.

8. The assembly of claim 1, wherein alignment of the blades relative to the portion for receiving the workpiece is pre-set within the die assembly.

9. The assembly of claim 1, wherein the base die plate is the only portion of the die assembly attachable to the press.

10. The assembly of claim 1, wherein the upper die plate includes a shock absorber on an upper surface of the upper die plate for contact with the press ram.

11. The assembly of claim 1, further comprising a plurality of vertical posts fixed to the base die plate, the centre die plate and the upper die plate mounted and vertically movable on the posts.

* * * * *